United States Patent
Carus et al.

(10) Patent No.: US 7,818,175 B2
(45) Date of Patent: Oct. 19, 2010

(54) SYSTEM AND METHOD FOR REPORT LEVEL CONFIDENCE

(75) Inventors: Alwin B. Carus, Waban, MA (US); Larissa Lapshina, Shirley, MA (US); Elizabeth M. Lovance, Somerville, MA (US)

(73) Assignee: Dictaphone Corporation

(*) Notice: Subject to any disclaimer, the term of this patent is extended or adjusted under 35 U.S.C. 154(b) by 229 days.

(21) Appl. No.: 11/191,814

(22) Filed: Jul. 28, 2005

(65) Prior Publication Data
US 2006/0026003 A1 Feb. 2, 2006

Related U.S. Application Data

(60) Provisional application No. 60/592,123, filed on Jul. 30, 2004.

(51) Int. Cl.
G10L 21/00 (2006.01)
G10L 15/26 (2006.01)

(52) U.S. Cl. .................... 704/270; 704/235
(58) Field of Classification Search ........... 704/235, 704/270
See application file for complete search history.

(56) References Cited

U.S. PATENT DOCUMENTS

| | | | |
|---|---|---|---|
| 5,146,439 | A | 9/1992 | Jachmann et al. |
| 5,268,990 | A | 12/1993 | Cohen et al. |
| 5,519,808 | A | 5/1996 | Benton, Jr. et al. |
| 5,602,982 | A | 2/1997 | Judd et al. |
| 5,748,888 | A | 5/1998 | Angelo et al. |
| 5,799,276 | A | 8/1998 | Komissarchik et al. |
| 5,812,882 | A | 9/1998 | Raji et al. |
| 5,857,212 | A | 1/1999 | Van De Vanter |
| 5,875,448 | A | 2/1999 | Boys et al. |
| 5,883,986 | A | 3/1999 | Kopec et al. |
| 6,006,183 | A | 12/1999 | Lai et al. |
| 6,122,614 | A | 9/2000 | Kahn et al. |
| 6,366,882 | B1 | 4/2002 | Bijl et al. |
| 6,374,225 | B1 | 4/2002 | Hejna, Jr. |
| 6,415,256 | B1 | 7/2002 | Ditzik |
| 6,438,545 | B1 | 8/2002 | Beauregard et al. |
| 6,535,849 | B1 | 3/2003 | Pakhomov et al. |
| 6,584,205 | B1 | 6/2003 | Crift et al. |
| 6,799,162 | B1 | 9/2004 | Goronzy et al. |
| 6,865,258 | B1 | 3/2005 | Polcyn |

(Continued)

OTHER PUBLICATIONS

Stephen Cox, "High-Level Approaches to Confidence Estimation in Speech Recognition," *IEEE Transactions on Speech and Audio Processing*, Oct. 2002, pp. 460-471, vol. 10, No. 7, IEEE, New York, NY.

(Continued)

*Primary Examiner*—Angela A Armstrong
(74) *Attorney, Agent, or Firm*—Wolf, Greenfield & Sacks, P.C.

(57) ABSTRACT

A system and method is disclosed for Report Confidence Modeling (RCM) including automatic adaptive classification of ASR output documents to determine the most efficient document edit workflow to convert dictation into finished output. The RCM according to the present invention may include a mechanism to predict recognition accuracy of a document generated by an ASR engine. Predicted accuracy of the document allows an ASR application to sort recognized documents based on their estimated accuracy or quality and route them appropriately for further processing, editing and/or formatting.

13 Claims, 3 Drawing Sheets

U.S. PATENT DOCUMENTS

| | | | |
|---|---|---|---|
| 6,879,956 | B1 | 4/2005 | Honda et al. |
| 6,912,498 | B2 | 6/2005 | Stevens et al. |
| 6,950,994 | B2 | 9/2005 | Dharap |
| 6,961,699 | B1 | 11/2005 | Kahn et al. |
| 6,996,445 | B1 | 2/2006 | Kamijo |
| 7,016,844 | B2 * | 3/2006 | Othmer et al. ........... 704/270.1 |
| 7,031,918 | B2 | 4/2006 | Hwang |
| 7,236,932 | B1 | 6/2007 | Grajski |
| 2002/0188452 | A1 | 12/2002 | Howes |
| 2003/0046080 | A1 | 3/2003 | Hejna, Jr. |
| 2003/0046114 | A1 | 3/2003 | Davies et al. |
| 2003/0061135 | A1 | 3/2003 | Waibel |
| 2003/0067495 | A1 | 4/2003 | Pu et al. |
| 2003/0154085 | A1 | 8/2003 | Kelley |
| 2004/0049385 | A1 | 3/2004 | Lovance et al. |
| 2005/0096910 | A1 | 5/2005 | Watson et al. |
| 2005/0102140 | A1 | 5/2005 | Davne et al. |
| 2005/0149747 | A1 | 7/2005 | Wesinger et al. |
| 2006/0041428 | A1 | 2/2006 | Fritsch et al. |
| 2006/0206943 | A1 | 9/2006 | Ellison et al. |
| 2006/0253895 | A1 | 11/2006 | Brandofino et al. |
| 2006/0272025 | A1 | 11/2006 | Mononen |
| 2007/0143857 | A1 | 6/2007 | Ansari |
| 2007/0276649 | A1 | 11/2007 | Schubert |
| 2007/0283444 | A1 | 12/2007 | Jang |
| 2007/0294745 | A1 | 12/2007 | Tan et al. |
| 2007/0300287 | A1 | 12/2007 | Wynne et al. |

OTHER PUBLICATIONS

Hui Jiang, "Confidence Measures for Speech Recognition: A Study," Technical Report CS-2003-06, May 30, 2003, pp. 1-27, York University, Department of Computer Science, Ontario, Canada.

Tatsuya Kawahara, Kazunori Komatani, and Shuji Doshita, "Dialogue Management Using Concept-Level Confidence Measures of Speech Recognition," date presently unknown, Kyoto University, School of Informatics, Kyoto, Japan and Ryukoku University, Otsu, Japan.

Diane J. Litman, Marilyn A. Walker, and Michael S. Kearns, "Automatic Detection of Poor Speech Recognition at the Dialogue Level," date presently unknown, AT&T Labs Research, Florham Park, NJ.

Erhan Mengusoglu and Christopher Ris, "Use of Acoustic Prior Information for Confidence Measure in ASR Applications," 2001, Faculte Polytechnique de Mons, TCTS Lab, Mons, Belgium.

Gabriel Skantze, "The Use of Speech Recognition Confidence Scores in Dialogue Systems," Feb. 26, 2003, pp. 1-11, Department of Speech, Music and Hearing, KTH, Stockholm, Sweden.

Timothy J. Hazen, Stephanie Sennef & Joseph Polifroni, "Recognition Confidence Scoring and Its Use in Speech Understanding Systems," *Computer Speech and Language*, 2002, pp. 49-67, vol. 16, Academic Press.

Larry Gillick, Yoshiko Ito & Jonathan Young, "A Probabilistic Approach to Confidence Estimation and Evaluation," Proceedings to IEEE Int'l Conf. on Acoustics, Speech, and Signal Processing, Apr. 1997, pp. 879-882.

Thomas Kemp & Thomas Schaaf, "Estimating Confidence Using Word Lattices," Proceedings to the 5th European Conf. on Speech Communication and Technology, Sep. 1997, pp. 827-830.

Benoit Maison & Ramesh Gopinath, "Robust Confidence Annotation and Rejection for Continuous Speech Recognition," Proceedings to IEEE Int'l Conf. on Acoustics, Speech, and Signal Processing, 2001.

Changxue Ma, Mark A. Randolph & Joe Drish, "A Support Vector Machines-Based Rejection Technique for Speech Recognition," Proceedings to IEEE Int'l Conf. on Acoustics, Speech, and Signal Processing, 2001.

C. Uhrik, "Confidence Metrics Based on N-Gram Language Model Backoff Behaviors," Proceedings to Eurospeech Conf., 1997.

Stephen Cox & Srinandan Dasmahapatra, "A Semantically-Based Confidence Measure for Speech Recognition," Proceedings to the Int'l Conf. on Spoken Language Processing, 2000, Beijing, China.

Dan Bohus & Alex Rudnicky, "Integrating Multiple Knowledge Sources for Utterance-Level Confidence Annotation in the CMU Communicator Spoken Dialog System," Report CS190, 2002, Carnegie Mellon University.

Gabriel Skantze, "The Use of Speech Recognition Confidence Scores in Dialogue Systems," *Speech Technology*, Feb. 26, 2003, pp. 1-11.

Kazunori Komatani & Tatsuya Kawahara, "Flexible Mixed-Initiative Dialogue Management Using Concept-Level Confidence Measures of Speech Recognizer Output," Proceedings to the Int'l Conf. on Computational Linguistics (COLING), 2000.

Ruben San-Segundo, Bryan Pellom, Kadri Hacioglu & Wayne Ward, "Confidence Measures for Spoken Dialogue Systems," Center for Spoken Language Research, University of Colorado, 2001.

Batty et al., "The development of a portable real-time display of voice source characteristics", IEEE, 2:419-422 (2000).

* cited by examiner

# SYSTEM AND METHOD FOR REPORT LEVEL CONFIDENCE

CROSS-REFERENCE TO RELATED APPLICATIONS

This application claims the benefit of priority from U.S. Provisional Application Ser. No. 60/592,123, filed Jul. 30, 2004 entitled "A System and Method for Report Level Confidence".

BACKGROUND OF THE INVENTION

The present invention relates generally to a system and method for classifying the confidence or quality of an automatically transcribed report or document.

Today's speech recognition technology enables a computer to transcribe spoken words into computer recognized text equivalents. Automatic Speech Recognition (ASR) is the process of converting an acoustic signal, captured by a transducive element, such as a microphone or a telephone, to a set of text words in a document. These words can be used for numerous applications including data entry and word processing. The development of speech recognition technology is primarily focused on accurate speech recognition.

The accuracy of a speech recognition system or a recognizer depends on many different variables including accents, regional language differences, subject matter and speech patterns. Because of this variability in accuracy, automatically transcribed documents typically require editing to correct errors made by the recognizer during transcription. In some cases, the error rate of a recognizer may be too high and the amount of editing required for a given document with a low recognition accuracy may require more effort, time, and cost to edit than if the given document had been transcribed by a human transcriptionist in the first place. This dilemma often results in low consumer confidence in speech recognition systems or even abandonment of automatic speech recognition systems in environments where the recognizer accuracy is low.

As a result, Report Confidence Modeling (RCM) systems have been devised to rate and score a particular ASR system. A typical RCM system includes a mechanism to predict recognition accuracy by an ASR system. Predicted accuracy allows an ASR system to sort recognized documents based on their estimated accuracy (quality) and route them appropriately for further processing (for example, editing and formatting).

The idea of sorting recognized documents by predicted recognition accuracy comes from the assumption that editing recognized documents (correcting misrecognitions) provides productivity gains compared to typing if recognition quality is good (higher than a certain threshold). If recognition accuracy is not good enough, it is more efficient to type the document rather than correct misrecognitions. Accuracy of text generated by ASR can be predicted based on several factors, including, but not limited to, (a) the confidence values of recognized words; (b) the lexical classes of certain recognized words; (c) temporal characteristics of the recognized report; and (d) speaker's historical behavior. RCM models may be static, factory models developed without reference to site-specific or user-specific data, or adapted models developed by collecting site-specific and user-specific data.

"Good" (i.e., those with high recognition accuracy) documents could be routed to transcriptionists or self-editing doctors for editing (error correction, editing, and formatting) while "bad" (i.e., those with low recognition accuracy) documents could be routed for further ASR processing or for being typed from scratch by a transcriptionist.

There has been significant research on, and development of, confidence rating systems and measures of ASR systems. Some traditional confidence rating systems are based on the probability of the acoustic observation given the speech segment normalized by the general probability of the acoustic observation. There have also been attempts to develop techniques for word confidence estimation that are independent of the architecture and operation of the word recognizer. Other confidence measurements systems use content level and semantic attributes, using the 10 best outputs of a speech recognizer and parsing the output with phrase level grammar. Still others use out-of-vocabulary words and errors due to additive noise to produce an acoustic confidence measure.

A drawback of each of the above mentioned systems is that they focus on the confidence of ASR system at the word level. This principle is known as dialogue management. Use of dialogue management is helpful to determine whether a particular statement has been reliably recognized and converted to text. This confidence rating can be combined with other tools to improve automatic transcription accuracy, such as a parser, to mitigate the dilemma of excessive editing of automatically transcribed documents. However, it is important to note again that these confidence measurements and tools are focused on a word level and are not combined to produce a document level confidence measurement.

Additional attempts to control the amount of editing include identifying certain speakers and accents that are poorly recognized by a recognizer or speech recognition engine. Those speakers can be identified in advance and dictations by those speakers may be routed directly to a human transcriptionist rather than a speech recognition system.

Despite this, traditional speech recognition systems suffer from an all or nothing condition. In other words, traditional systems are incapable of determining, in advance of editing an automatically transcribed document, the most efficient and cost effective workflow. This latter principle is known as document management. As stated above, traditional confidence measurement systems are limited to dialogue management and cannot determine whether it is more effective to employ a recognizer and subsequently edit the automatically transcribed document or to abandon the recognizer and the automatically transcribed document entirely for a traditional, strictly human transcription approach.

Therefore, there exists a need for a system and method of determining a document level confidence measurement for an entire automatically transcribed document. The document level confidence measurement may include not just quantifying the quality of the automatic transcription, but also quantifying additional factors affecting how easily the document may be edited or transcribed.

There also exists a need for a system and method for optimizing the workflow of transcribing dictations based the document level confidence measurement.

What is also needed is a system and method for, based on the document level confidence, determining the more efficient of two options: editing an automatically transcribed document or abandoning the automatically transcribed document for the traditional human transcription.

What is further needed is a speech application to implement a strategy of combining self editing and transcriptionists in a cost-effective manner.

SUMMARY OF THE INVENTION

An embodiment of the present invention includes a system and method for Report Confidence Modeling (RCM) including automatic adaptive classification of ASR output documents to determine the most efficient document edit workflow to convert dictation into finished output. RCM according to the present invention may include a mechanism to predict recognition accuracy of a document generated by an ASR engine. Predicted quality of the document allows an ASR application to sort recognized documents based on their estimated accuracy or quality and route them appropriately for further processing, editing and/or formatting.

Briefly, in transcriptionist environments it is important to have a way to select only high recognition accuracy documents to be edited as draft documents. The systems and methods described herein can be used to maximize editable reports by filtering on a per-document, rather than solely per-speaker basis. Poor quality documents can be filtered from generally good speakers and high-quality documents can be preserved from generally poor speakers. User may be presented with an indication of predicted quality along with the job output while having the option to choose his/her preferred editing method, Additionally, low-confidence jobs can be automatically filtered out of the transcription stream and a history of rate of high predicted accuracy jobs per speaker can be used to determine which jobs are sent for recognition, thereby optimizing server-use.

A method of evaluating speech recognition according to one aspect of the present invention methods may be based on the comparison between a literal transcript of what the speaker spoke and the output of a recognition engine or by analyzing signal quality. An advantage of this type of method as compared to traditional truth based scoring is that humane effort as part of workflow can be leveraged to customize based on perceived productivity, rather than only accuracy. As compared to historical scoring based on previously edited documents the present invention does not require waiting until documents are generated to implement and a user may begin scoring documents with factory model immediately. As compared to per-document scoring (reliability/efficiency), the per-word confidence can be confusing and may not focus upon information the user needs to predict his/her productivity, i.e., the overall quality of the document.

A final advantage of the of per-document, pre-edited score is that individual poor scoring documents may be filtered and quality is known in advance of editing for a particular document, rather than relying on historical scores.

As such, in a first embodiment, the present invention includes a method for optimizing document management using report level confidence in a speech recognition system by first receiving a dictation having an automatic speech recognizer output and an audio file. A confidence score is predicted using a predetermined method and the automatic speech recognizer output is classified using the predicted confidence score and predetermined filter settings. The dictation is then routed based upon the classified automatic speech recognizer output to a first editing location or a second editing location and converted into a finished product. The routing of the dictation is determined based upon the previously determined classification of the automatic speech recognizer output.

BRIEF DESCRIPTION OF THE DRAWINGS

While the specification concludes with claims particularly pointing out and distinctly claiming the present invention, it is believed the same will be better understood from the following description taken in conjunction with the accompanying drawings, which illustrate, in a non-limiting fashion, the best mode presently contemplated for carrying out the present invention, and in which like reference numerals designate like parts throughout the Figures, wherein:

DETAILED DESCRIPTION OF THE PREFERRED EMBODIMENTS

The present disclosure will now be described more fully with reference to the figures in which embodiments of the present invention are shown. The subject matter of this disclosure may, however, be embodied in many different forms and should not be construed as being limited to the embodiments set forth herein.

Initially a recognized file will provide an indication of high or low projected recognition quality which indication is generated using a model and multiple features of recognition output including predicted accuracy. Certain models may be tuned to adjust threshold for high and low confidence by changing both threshold and the scoring strictness. Users may adjust the confidence flag for the tolerances of their transcription staff. If these parameters are not set, the default threshold and strictness will be used. A set of default Report Confidence Models may be provided that will generate useable predicted accuracy scores. After enough files have been collected user-specific and user/transcriptionist-specific models can be adapted. These adapted models may use comparisons of edited documents to recognized text, transcriptionist feedback and other available measures of historical speaker/transcriptionist behavior.

In one embodiment, a confidence measurement is generated during each recognition job using the default Report Confidence Model. An indication of predicted accuracy is inserted into the recognition output. A configurable setting allows the user to either automatically reject low-confidence jobs or preview all jobs. For jobs of both types, the transcriptionist has the option of editing or transcribing a report. It is assumed that most low-confidence jobs will be transcribed and most high-confidence jobs will be edited. Finished reports, regardless of transcription method, are returned to the server for storage and further routing.

Figure 1:
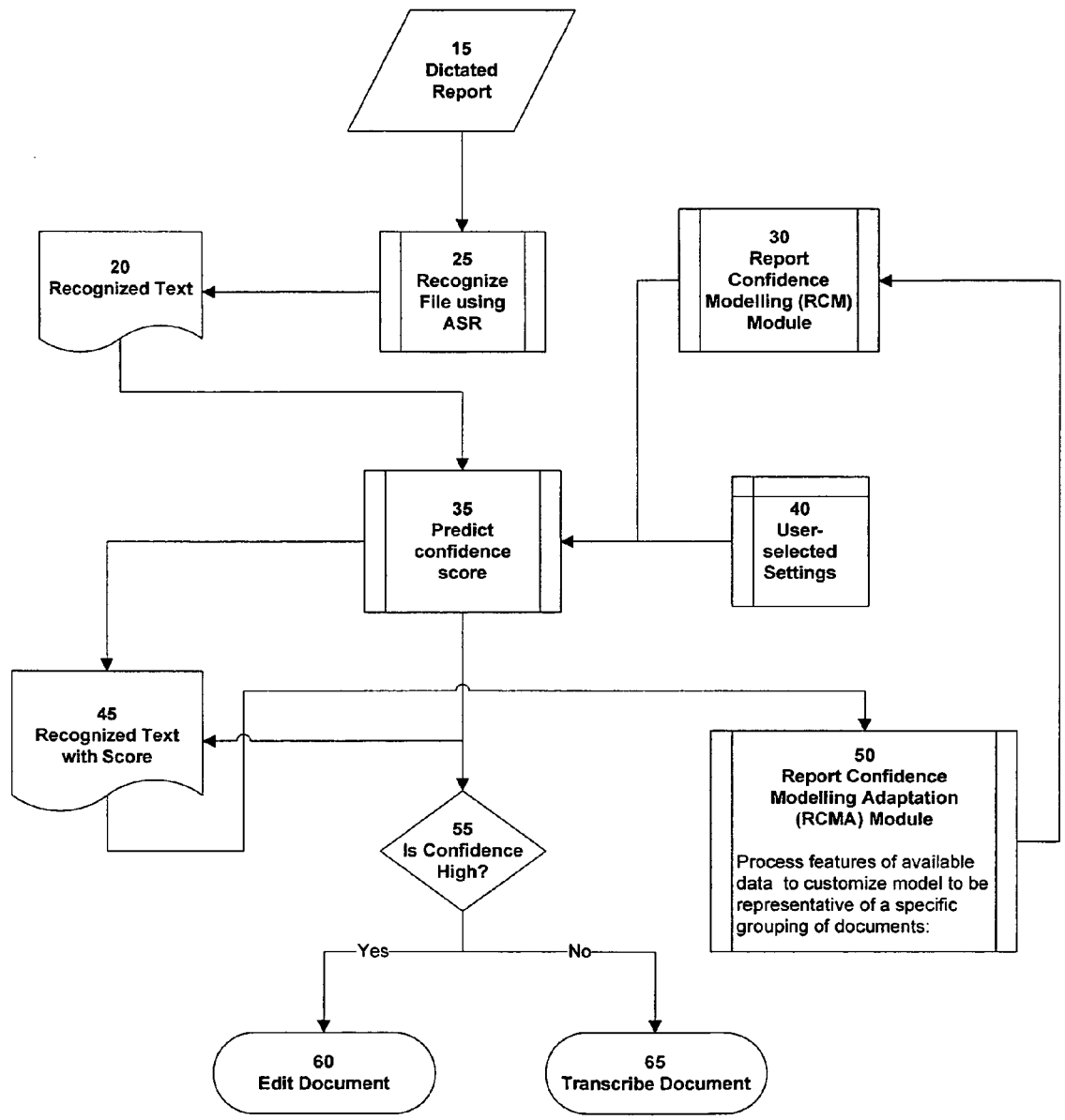
FIG. 1 shows a high level flow diagram of a system and method according to one embodiment of the present invention.

Referring now to FIG. 1, a flow diagram representing the system and method of automatically and adaptively classifying automatic speech recognition (ASR) output documents to determine the most efficient transcription workflow path to convert dictation into finished textual output. ASR software is run by a computer having a central processing unit (CPU). The CPU executes a computer code operatively associated with the CPU, which includes various sets of instructions used by the CPU to run the ASR software.

The flow diagram may begin with dictated report 15 being fed into the ASR or recognizer 25. Dictated report may consist of many different types of speech dictation across a variety of domains including medical reports, legal documents and police records. It is also contemplated that the delivery of dictated report may come from a multitude of different sources, such as computer systems, telephone systems, microphones, etc. The flow diagram as shown in FIG. 1 may be combined with a central dictation system serving a hospital or other large organization with many different speakers or may also be combined with smaller departments or users which may input a dictated report directly into the ASR without the assistance of a central dictation system.

Dictated report 15 may be recognized by ASR 25 to produce recognized text 20. Recognized text 20 may be produced by any commercial recognizer or ASR. Recognized text 20 may then be received in step 35 where a confidence score may be inserted into recognized text 20. Confidence score 35 may be generated using input from RCM module 30, the user selected settings 40 and recognized text 20. The method of generating confidence score 35 will be discussed in detail below.

Confidence score 35 may be evaluated to determine if confidence score 35 is high enough 10 or has met a predetermined threshold in step 55 if confidence score 35 is high enough, then recognized text 20 may be determined accurate enough such that editing 60 recognized text 20 is the most efficient transcription workflow path. Alternatively, if confidence score 35 is determined to be too low, then recognized text 20 may be discarded such that dictated report 15 may be transcribed by a traditional human transcriptionist. Therefore, transcribing dictated 15 report using a human transcriptionist may be the most efficient transcription workflow path when confidence score 35 is determined to be too low.

It is important to note that confidence 35 may be more of a measurement of utility than purely a measurement of recognition accuracy. Confidence score 35 may indicate whether or not it is more utilitarian or efficient to edit recognized text 20 or to abandon recognized text 20 and simply transcribe dictated report 15. As such, confidence score 35 could simply be an objective measure of the accuracy of recognized text 20 in one embodiment of the invention. However, the confidence report 35 may also include a more expansive approach to determining the factors affecting the editing and transcribing dictated report 15.

Confidence score 35 and recognized text 20 may also be delivered to the report confidence modeling adaptation (RCMA) module 50. RCMA module 50 may generate feedback data delivered to RCM module 30 used to improve the modeling capabilities of RCM module 30 and generate a more accurate confidence score 35.

Figure 2:
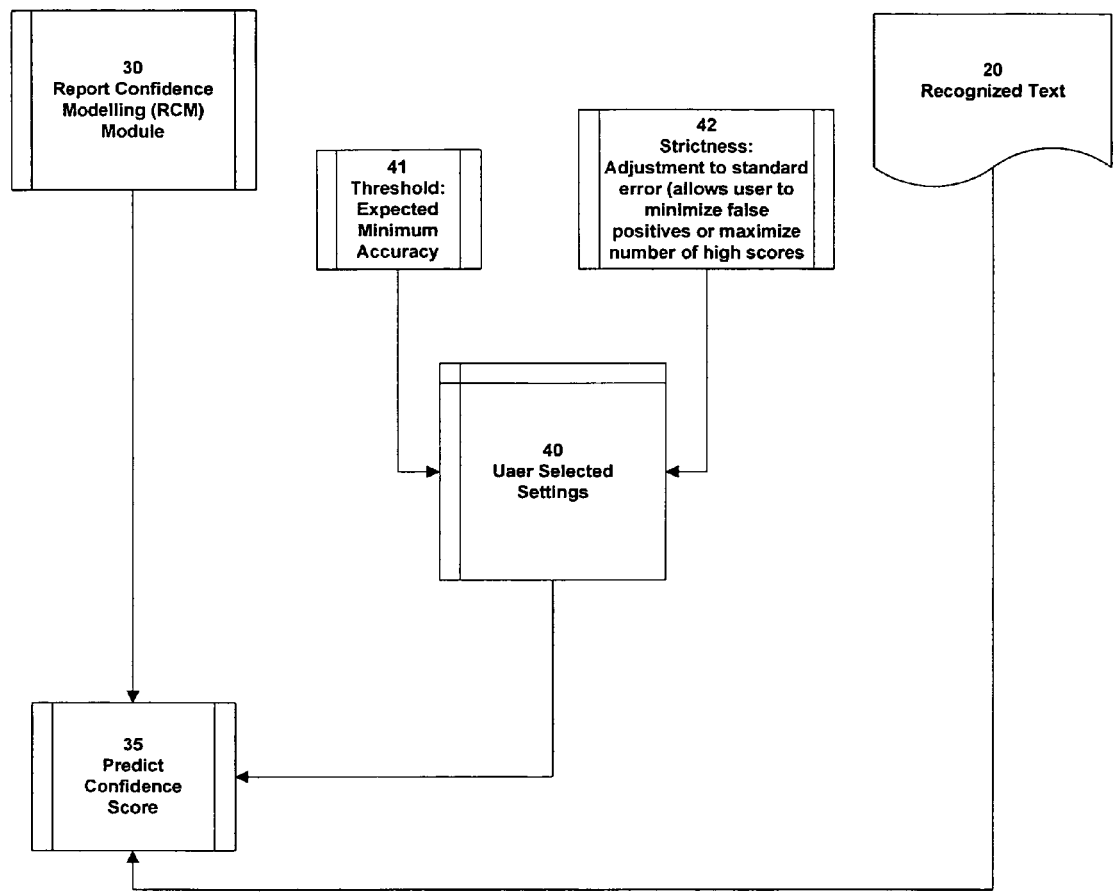
FIG. 2 shows a flow diagram of user selected settings according to one embodiment of the present invention.

Referring to FIG. 2, a flow diagram details the inputs into predicting confidence score 35. It is important to note that ASR systems produce recognized text and produce confidence measures for words in dictated report 15. Other confidence measurements may also be provided by the ASR upon converting dictated report 15 into recognized text 20. The different confidence measures generated by the ASR are provided to predict confidence score 35 along with recognized text 20 in FIG. 2.

As shown in FIG. 2, the user selected settings 40 may include inputs from a threshold 5 measure 41 and a strictness measure 42. Threshold 41 may be used to adjust how high confidence score 35 must be in order for editing 60 recognized text 20 to be the most efficient workflow path. Strictness measure 42 may be used to provide adjustment to a standard error. This strictness 42 may allow users to minimize false positives or maximize the number of high confidence scores 35.

The user selected settings 40 in FIG. 2 allows for two different options. The first option may be to set a threshold 41 based on recognition accuracy or confidence score 35. Therefore, it may be assumed that the system will only edit recognized text 20 when confidence score 35 reflects a certain level of accuracy. For example, threshold 41 may require documents with at least 90% of the words correct. The second option may be to set strictness 42 such that there is some degree of confidence score 35 that is acceptable even if confidence score 35 falls below threshold 41. It is contemplated that these settings for threshold 41 and strictness 42 may be set for the entire system shown in FIG. 1 or may be set for individual speakers and/or transcriptionists. It is also contemplated that these settings may be set according to different modes, different work type, or perhaps having to do with certain types of errors.

Additionally, threshold 31 and strictness 42 may also consider other factors. The relative cost of different operations may be considered in setting the user selected settings 40. Further, it may be possible to actually adjust the factors by understanding the essential risk and cost of doing certain types of operations as opposed to the other. For example, the cost of doing formatting type corrections rather than content corrections may be considered as a factor in establishing strictness 42. Likewise, operations such as making substitutions, correcting spelling, inserting or deleting text, and other such operation may also be considered in selecting the user selected settings 40.

Although the system can be applied to all speakers and transcriptionists, the system shown in FIG. 1 may also be applied to specific speakers and/or transcriptionists. In this situation, the system may be able to anticipate looking at any given speaker and/or any given a transcriptionist and assign appropriate user selected settings 40 specific to the speaker and/or transcriptionist. The system may also be able to estimate for a site what the actual the costs are for running the system for some workload at give thresholds 41 and strictness 42. Users of the system may then be able to optimize the system further by adjusting the user selected settings 40 to optimize for specific requirements such as time efficiency and/or cost effectiveness. As such, the system as shown in FIG. 1 may provide users the ability to more accurately manage a dictation and transcription system than ever before.

It is also possible that the user might use the system as shown in FIG. 1 for the ability to look at the percentage of jobs for a particular speaker. If the dictated reports 15 for a particular speaker are consistently getting high or low confidence scores 35, the user of the system may chose to use this information to short circuit the process and strictly have the speaker's dictated reports follow the most efficient transcription workflow path without the calculation of a confidence score 35. As such, the different management information available to the user selected settings 40 and the information that may be extracted from the system may provide a variety of management modes with a variety of efficiencies of the management of the workload. This level of management would not be possible without the user selected settings 40 and confidence scores 35.

Figure 3:
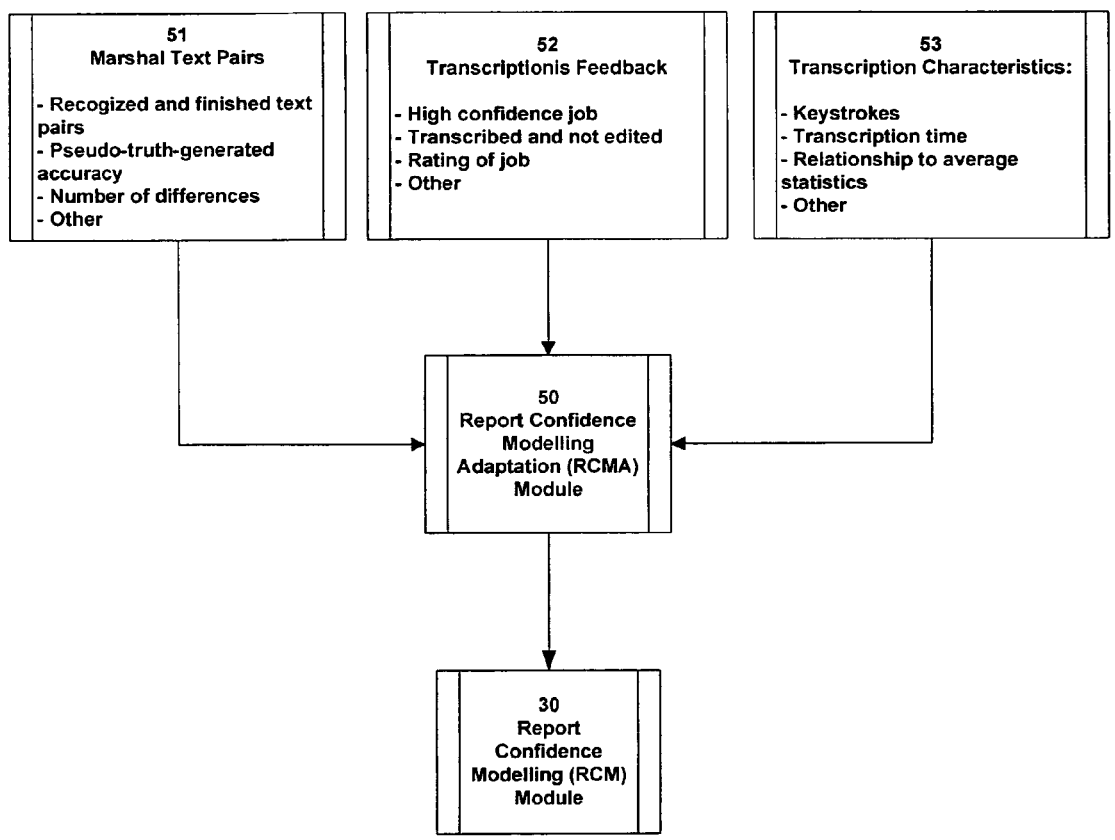
FIG. 3 shows a flow diagram of a report confidence modeling adaptation module according to one embodiment of the present invention.

Referring to FIG. 3, a flow diagram details RCMA module 50 receiving input from the marshal text pairs 51, the transcriptionist feedback 52 and the transcription characteristics 53. RCMA module 50 may act to analyze the dictated reports 15 that pass through the system and either are edited or transcribed by a transcriptionist. By analyzing previous dictated reports that have been converted into a final text document by editing or transcription, RCMA module 50 may identify common or recurring error as well as collect information from the transcriptionists regarding the cost and efficiency of the editing path 60 or transcription path 65.

Marshal text pairs 51 may be provided to RCMA module 50 to improve recognized and finished text pairs. These pairs are collected from correctly recognized text documents as a form of feedback and allow RCMA module 50 to identify and highlight pairs of words that may have a low confidence level individually from the ASR but have a high confidence level when found in pairs. These text pairs 51 may then be directed to RCM module 30 to be used in predicting confidence score 35 for recognized text 20.

The marshal text pairs 51 may also be used for pseudo-truth-generated accuracy. This pseudo-truth-generated accuracy may be used to improve the confidence level of documents. Further, the number of required edits may also be collected and used to predict confidence by comparing the recognized text to known spellings or phrases. The fewer the differences the greater the confidence in the recognized text. Other information may also be collected and used to predict the confidence of the recognized document. All of these may be analyzed and then provided to RCM module 30 to be used in predicting confidence score 35 for recognized text 20.

Transcriptionist feedback 52 may also be provided to RCMA module 50 to aid in determining which dictated reports 15 would follow the editing path 60 or the transcription path 65. Data may be collected on finished reports that received a high confidence score 35 and where edited. Data may also be collected on finished reports that received a low confidence score 35 and were traditionally transcribed. The data collected could include the performance evaluations, an overall rating of the job, etc. Other information can also be collected about the individual transcriptionist such as skill level and training. This transcriptionist feedback 52 may then be analyzed and provided to RCM module 30 to be used in predicting confidence score 35 for recognized text 20.

Transcription characteristics 53 may also be provided to RCMA module 50 to aid in determining which dictated reports would follow the editing path 60 or the transcription path 65. Data may be collected on the number and speed of keystrokes during editing or transcribing. The length of time taken for editing and transcribing individual reports may also be collected. The relationship between the transcription characteristics of a given dictated report 15 and the average statistics for finished reports may be analyzed to provide additional data. This data as well may be analyzed and provided to RCM module 30 to be used in predicting confidence score 35 for recognized text 20.

Although FIG. 3 shows RCMA module 50 receiving data from the marshal text pairs 51, the transcriptionist feedback 52, and the transcription characteristics 53 and providing this data to RCM module 30 in order to better model and assist in predicting confidence score 35, it should be noted that RCMA module 50 may receive and deliver information in any combination or even 30 not at all depending on the information available at any given time. It is also contemplated that RCMA module 50 in providing data to RCM module 30 may consider some additional factors. By incorporating historical data from editing, transcribing, transcriptionists, and speakers, the overall system shown in FIG. 1 may adapt to different dictation environments and optimize the system for the most efficient and cost effective workflow paths. The system may also adapt to changes in the system such as adding or subtracting transcriptionists.

It is also contemplated that the relationship between specific transcriptionist and specific speakers may be analyzed to determine a confidence score 35. As skills between transcriptionists vary, it may be possible to adjust confidence score 35 depending on the specific speaker providing dictated report 15 and the specific transcriptionist performing the editing under step 60 and the transcribing under step 65.

Referring now to RCM module 30, the particular techniques that are used to create confidence score 35 and the actual inputs to the RCM module 30 are actually quite a bit different than the typical kinds techniques and inputs used also for other confidence measures. This may be attributed to the fact that other confidence measures are focused on word based confidence measures. Word based confidence measures tended to use, for example, purely acoustic features rather than actually bringing in other external linguistic or structural features, semantics, syntatic or other document type features. In fact, much of the word level confidence measures are exclusively on the subject basis.

However, RCM module 30 actually incorporates essentially the broadest possible range 20 of features into confidence score 35 because RCM module 30 needs not only to understand core recognition but also all the structural configurational attributes of the document. These structural configurational attributes directly affect how efficiently and cost effectively recognized text 20 can be edited in step 60. It is important to note that the broad range of features are considered in establishing confidence score 35 because confidence score 35 may be evaluating a document containing many words.

Therefore, in producing a confidence score 35, RCM module 30 considers what kind of factors or features are relevant and how to actually combine those features into a confidence score 35. RCMA module 50 discussed above may additionally aid the process by providing historical data and other information that may be used to indicate how confidence score 35 actually relates to the most efficient transcription workflow path. Machine learning algorithms and classification methods may be used to evaluate the factors and features received in RCM module 30 in order to produce a model for predicting confidence score 30. Recognized text 20 may include components relating to individual word confidences and other information that is produced by the recognizer 25 along with recognized text 20 that may be interpreted and used by RCM module 30. It must also contemplated that RCM module 30 may be an original model or may be a trained model after receiving input from RCMA module 50. Machine learning algorithms may be used train RCMA module 50 and the RCM module 30.

Referring again to the system shown in FIG. 1, thresholds, established in the user selected settings 40, may be used as breakpoints and relate confidence score 35 to a decision on workflow efficiency. This decision may act as making cuts between the different groups: those recognized reports 20 that will be edited and those recognized reports 20 that will be discarded and completely transcribed by a human transcriptionist.

It will be apparent to one of skill in the art that described herein is a novel system and method for automatically generating report-level confidence. While the invention has been described with reference to specific preferred embodiments, it is not limited to these embodiments. The invention may be modified or varied in many ways and such modifications and variations as would be obvious to one of skill in the art are within the scope and spirit of the invention and are included within the scope of the following claims.

The invention claimed is:

1. A computer implemented method of transforming a dictation into text comprising steps of:

receiving said dictation by a computer;

automatically transcribing said dictation into recognized text by automatic speech recognition;

determining a document level confidence score measurement from said recognized text, said document level confidence measurement determination based, at least in part, on word-level recognition accuracy in said automatic transcription and at least one document-level feature affecting how easily the document may be edited or transcribed;

establishing a predetermined confidence measurement threshold value;

submitting said recognized text for editing if said confidence measurement exceeds said predetermined confidence measurement threshold value; and manually transcribing said dictation into text if said confidence measurement does not exceed said predetermined confidence measurement threshold value.

2. The method of claim 1 wherein the confidence measurement is determined by modeling.

3. The method of claim 2 wherein the modeling has a threshold component and a scoring strictness component.

4. The method of claim 3 wherein the threshold component is based on the level of accuracy of the recognized text.

5. The method of claim 3 wherein the scoring strictness component provides an acceptable range of confidence scores for the recognized text.

6. The method of claim 3 wherein the modeling also includes a cost effectiveness component.

7. The method of claim 1 wherein the dictation and recognized text are routed to an adaptation modeling module for final editing.

8. The method of claim 7 wherein automatic speech recognition software performs the editing.

9. The method of claim 1 wherein the dictation and recognized text are routed to a transcriptionist for editing.

10. The method of claim 1 wherein the dictation and recognized text also are routed based on predetermined filter settings.

11. The method of claim 1 further comprising the step of providing a report confidence model.

12. The method of claim 11 wherein the confidence score is determined from the report confidence model.

13. The method of claim 11 further comprising the step of customizing the report confidence model based on collected reports, automatic speech recognizes documents, and/or descriptive information corresponding to the corrected reports and automatic speech recognizer documents.

* * * * *